(12) United States Patent
Lin et al.

(10) Patent No.: US 9,166,847 B2
(45) Date of Patent: Oct. 20, 2015

(54) SIGNAL RECEIVING APPARATUS AND TWO-STAGE ADAPTIVE EQUALIZATION METHOD THEREOF

(71) Applicant: MStar Semiconductor, Inc., Hsinchu Hsien (TW)

(72) Inventors: Po-Nien Lin, Hsinchu County (TW); Jyun-Yang Shih, Hsinchu County (TW); Jiunn-Yih Lee, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/597,391

(22) Filed: Jan. 15, 2015

(65) Prior Publication Data
US 2015/0207652 A1    Jul. 23, 2015

(30) Foreign Application Priority Data
Jan. 23, 2014  (TW) .............................. 103102449 A

(51) Int. Cl.
*H04L 27/01*   (2006.01)
*H04L 7/027*   (2006.01)

(52) U.S. Cl.
CPC ................ *H04L 27/01* (2013.01); *H04L 7/027* (2013.01)

(58) Field of Classification Search
CPC .......... H04L 2025/03726; H04L 2025/03732; H04L 1/20; H04L 25/03006; H04L 27/01; H04L 7/027; H04B 10/6971
See application file for complete search history.

(56) References Cited

U.S. PATENT DOCUMENTS

| | | | |
|---|---|---|---|
| 6,118,815 A * | 9/2000 | Hirth et al. ..................... 375/232 |
| 6,185,262 B1 * | 2/2001 | Brandstetter ................. 375/289 |
| 6,522,707 B1 * | 2/2003 | Brandstetter et al. ......... 375/350 |
| 6,546,047 B1 * | 4/2003 | Chen et al. .................... 375/229 |
| 8,958,512 B1 * | 2/2015 | Ding et al. .................... 375/350 |
| 2011/0026577 A1 * | 2/2011 | Primo et al. .................. 375/232 |

* cited by examiner

*Primary Examiner* — Leon Flores
(74) *Attorney, Agent, or Firm* — WPAT, PC; Justin King

(57) ABSTRACT

A signal receiving apparatus includes an equalization module, a coarse tuning module and a fine tuning module. The equalization module receives an input signal, and performs an equalization process on the input signal according to an equalization strength to generate an equalized signal. The coarse tuning module adjusts the equalization strength according to the equalized signal until the equalized signal satisfies a preliminary convergence condition. When the preliminary convergence condition is satisfied, the fine tuning module adjusts the equalization strength according to the equalized signal until the equalization strength satisfies a final convergence condition.

16 Claims, 7 Drawing Sheets

SIGNAL RECEIVING APPARATUS AND TWO-STAGE ADAPTIVE EQUALIZATION METHOD THEREOF

This application claims the benefit of Taiwan application Serial No. 103102449, filed Jan. 23, 2014, the subject matter of which is incorporated herein by reference.

BACKGROUND OF THE INVENTION

1. Field of the Invention

The invention relates in general to a signal equalization technology.

2. Description of the Related Art

An equalizer is an essential component at receiver end of many communication systems, and is utilized for compensating or eliminating deformation/attenuation resulted from non-ideal channel factors during a transmission process. Only by applying an appropriate equalization process (e.g., selecting an appropriate equalization strength) on an input signal, a receiver end may correctly parse and use received data. Taking a DisplayPort (DP) video interface of Video Electronics Standards Association (VESA) for example, the specification states that a receiver end needs to perform an equalization process following a clock recovery process.

In earlier versions of the DP video interface, a lower operating frequency (1.62 GHz or 2.7 GHz) is used, and a receiver end is usually required to only adopt a fixed equalization strength for receiver circuits to be functional. However, in newer versions of the DP video interface, not only an operating frequency is higher (5.4 GHz) but also a fault tolerance is lower, such that the design of adopting one fixed equalization strength may result in performance degradation of a receiving apparatus.

SUMMARY OF THE INVENTION

The invention is directed to a signal receiving apparatus and a two-stage adaptive equalization method applied to the signal receiving apparatus. In embodiments of the present invention, a process of selecting equalization strength is divided into two stages of coarse tuning and fine tuning that have different convergence conditions. In addition to adaptively adjusting the equalization strength according to an input signal, the signal receiving apparatus and the equalization method of the present invention are further capable of ensuring that the final selected equalization strength is within a correct range through the inspection of the two adjustment phases.

The concept of the present invention is not limited to applications of a certain signal receiving apparatus, and may be extensively implemented to situations where adaptive equalization processing is required, e.g., an electronic device adopting a DP interface, a High-Definition Multimedia Interface (HDMI), a Mobile High-definition Link (MHL) interface, a Serial Advanced Technology Attachment (SATA) interface, and a Universal Serial Bus 3.0 (USB 3.0) interface.

A signal receiving apparatus is provided according to an embodiment of the present invention. The signal receiving apparatus includes an equalization module, a coarse tuning module and a fine tuning module. The equalization module receives an input signal, and performs an equalization process on the input signal according to an equalization strength to generate an equalized signal. The coarse tuning module adjusts the equalization strength according to the equalized signal until the equalized signal satisfies a preliminary convergence condition. When the processed signal satisfies the preliminary convergence condition, the fine tuning module adjusts the equalization strength according to the equalized signal until the equalized strength satisfies a final convergence condition.

A two-stage adaptive equalization method applied to a signal receiving apparatus is provided according to another embodiment of the present invention. An equalization process is performed on an input signal according to an equalization strength to generate an equalized signal. The equalization strength is adjusted according to the equalized signal until the processed signal satisfies a preliminary convergence condition. When the equalized signal satisfies the preliminary convergence condition, the equalization strength is adjusted again according to the equalized signal until the equalization strength satisfies a final convergence condition.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
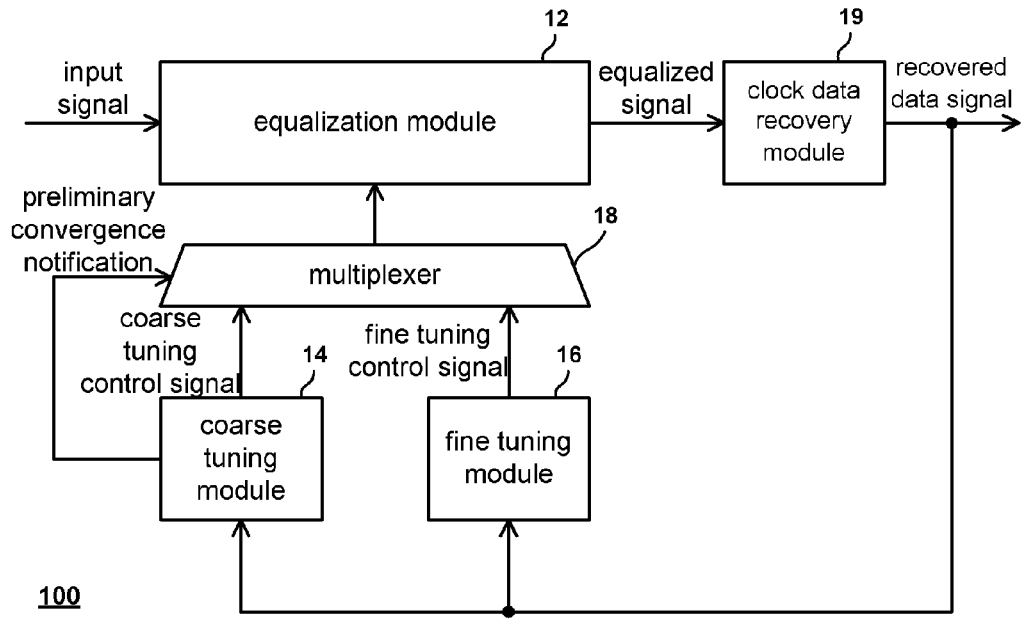
FIG. 1 is a block diagram of a signal receiving apparatus according to an embodiment of the present invention.

FIG. 1 shows a function block diagram of a signal receiving apparatus 100 according to an embodiment of the present invention. In the embodiment, the signal receiving apparatus 100 includes an equalization module 12, a coarse tuning module 14, a fine tuning module 16, a multiplexer 18 and a clock data recovery module 19. The equalization module 12 receives an input signal, and performs an equalization process on the input signal to generate an equalized signal. The equalization strength of the equalization process may first be set to an initial value. For example, the equalization strength of the equalization process has 32 levels respectively represented as level 0 to level 31, and the initial value may be level 0, for example. In other words, the equalization module 12 is set to initially perform the equalization process according to the initial equalization strength.

As shown in FIG. 1, the equalized signal outputted from the equalization module 12 is transmitted to the clock data recovery module 19 to generate a recovered data signal. The multiplexer 18 is defaulted to select and connect the coarse tuning module 14 to an input end of the equalization module 12. This input end receives a control signal of the equalization strength of the equalization module 12. The coarse tuning module 14 receives the recovered data signal, and accordingly generates a coarse tuning control signal. More specifically, the coarse tuning module 14 adjusts the equalization strength that the equalization module 12 uses according to the recovered data signal, until the recovered data signal satisfies a preliminary convergence condition. For example, the coarse tuning module 14 first determines whether the recovered data signal corresponding to the initial equalization strength satisfies the preliminary convergence condition. If not, the coarse tuning module 14 changes the equalization strength (e.g., increasing the equalization strength from level 0 to level 3) through the coarse tuning control signal, and again determines whether the recovered data signal corresponding to level 3 satisfies the preliminary convergence condition. When the coarse tuning module 14 determines that the recovered data signal corresponding to a predetermined equalization strength satisfies the preliminary convergence condition, the coarse tuning module 14 stops adjusting the equalization strength, and sends a preliminary convergence notification to the multiplexer 18, so as to change the multiplexer 18 to the fine tuning module 16 and the equalization module 12.

In practice, the amount of the equalization strength that the coarse tuning module 14 updates each time is not limited to a specific value, and may be determined by a circuit designer or a user. For example, the equalization strength may change at a time according to a sequence of: level 0, level 3, level 6 . . . level 30, level 0, level 3 . . . , and so forth. Further, the circuit designer may also set upper and lower limits of the equalization strength. For example, the equalization strength may change at a time according to a sequence of: level 10, level 13, level 16, level 19, level 22, level 25, level 22, level 19, level 16, level 13, level 10 . . . , and so forth.

In actual applications, the preliminary convergence condition may be in a quantity greater than 1, and the coarse tuning module may only send the preliminary convergence notification when several preliminary convergence conditions are satisfied. In one embodiment, the coarse tuning module 14 generates and analyzes an eye diagram of the recovered data signal, and determines whether an expansion level of the eye diagram of the preliminary convergence condition is greater than a threshold. It should be noted that, details for generating and analyzing the eye diagram are generally known to one person skilled in the art, and shall be omitted herein.

Figure 2:
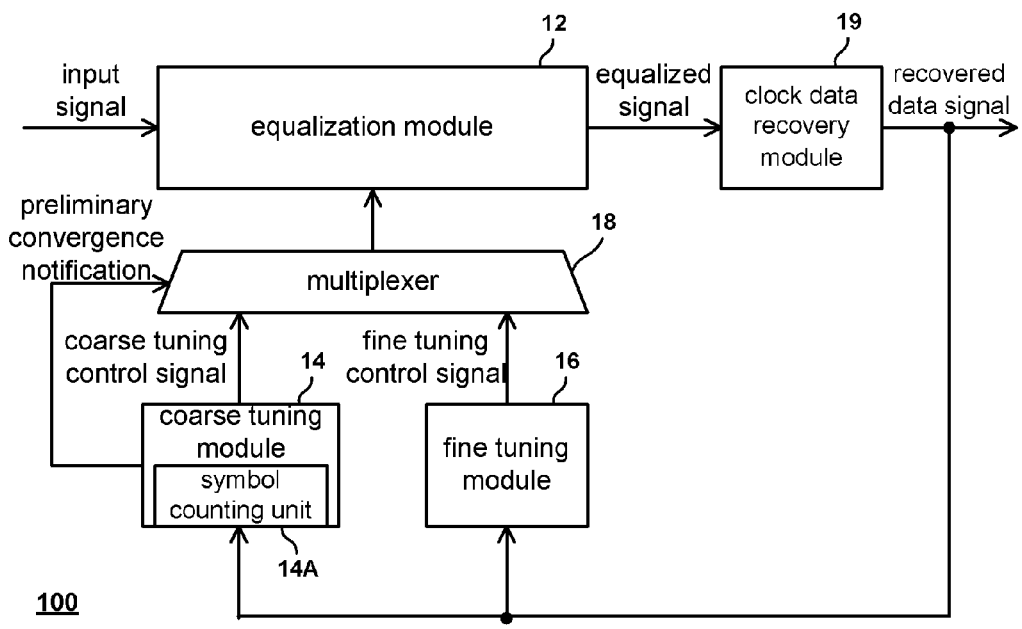
FIG. 2 is a coarse tuning module including a symbol counting unit according to an embodiment of the present invention.

In another embodiment, the preliminary convergence condition is whether the quantity of known symbols included in the recovered data signal is greater than a quantity threshold. As shown in FIG. 2, the coarse tuning module 14 may include a symbol counting unit 14A, which identifies a plurality of target symbols in the recovered data signal, and counts the total quantity of the target symbols occurring within a predetermined period of time. Taking a DP interface for example, before officially transmitting video data, a transmitter end first provides a receiver end with a training sequence that includes multiple K28.5 bit strings. For a predetermined equalization strength, the symbol counting unit 14A may identify and count the total quantity of the K28.5 bit strings in the corresponding recovered data signal. When the count result of the symbol counting unit 14A is greater than the above quantity threshold (e.g., 500), the coarse tuning module 14 determines that the recovered data signal satisfies the preliminary convergence condition. Conversely, when the count result corresponding to a predetermined equalization strength does not reach the quantity threshold, the coarse tuning module 14 may change the equalization strength, and iterates the step of identifying and counting the target symbols. The significance of satisfying the preliminary convergence condition indicates that the current equalization strength is sufficient for subsequent circuits to substantially parse signal contents correctly.

It should be noted that, the above target symbols are not limited to K28.5 bit strings, and may be selected by a circuit designer according to specifications of actual applications. For example, an HDMI-compliant or MHL-compliant input provided to the equalization module 12 does not include a training sequence, and therefore the target symbols to be identified by the symbol counting unit 14A may be a plurality of known control words in a blanking interval.

Figure 3:
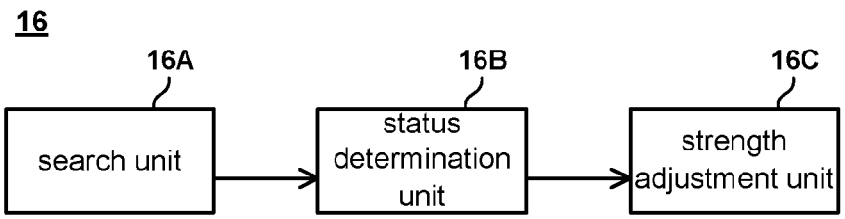
FIG. 3 is a fine tuning module according to an embodiment of the present invention.

As shown in FIG. 1, the fine tuning module 16 also receives the recovered data signal and accordingly generates a fine tuning control signal. When the multiplexer 18 is changed to the fine tuning module 16 and the equalization module 12 by the preliminary convergence notification from the coarse tuning module 14, the fine tuning module 16 adjusts the equalization strength that the equalization module 12 uses through the fine tuning control signal, until the equalization strength satisfies a final convergence condition. FIG. 3 shows a detailed example of the fine tuning module 16. In the embodiment, the fine tuning module 16 includes a search unit 16A, a status determination unit 16B and a strength adjustment unit 16. Details of the fine tuning module 16 are described below.

Figure 4A:
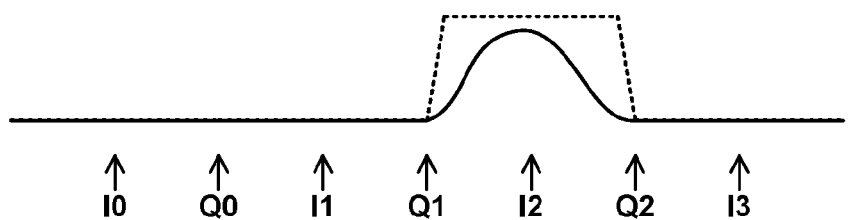
FIG. 4(A) and FIG. 4(B) are two examples of signal waveforms of data strings with contents 0010.
Figure 4B:
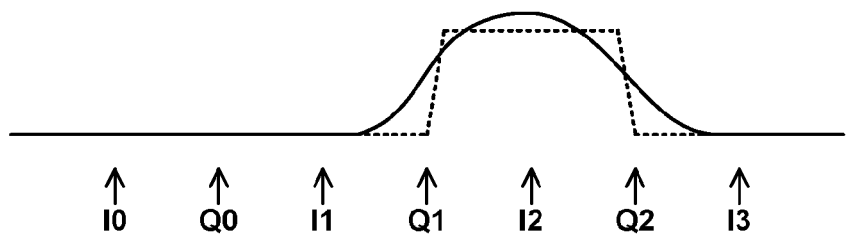

The search unit 16A identifies a plurality of data strings that match a target pattern from the recovered data signal. For example, the target pattern may be AABA, i.e., a data string having contents 1101 or 0010 in the recovered data signal. FIG. 4(A) and FIG. 4(B) show two examples of signal waveforms of data strings having contents 0010, where solid lines represent actual waveforms, and dotted lines represent ideal waveforms that are noise-free, attenuation-free and deformation-free. Sampling points I0 to I3 substantially correspond to respective center positions of the data bits, and sampling points Q0 to Q2 substantially correspond to respective intersections of every two data bits. In FIG. 4(A), sample results of the sample points I0, Q0, O1, Q1, I2, Q2 and I3 are sequentially 0, 0, 0, 0, 1, 0 and 0. As the sample results of the sample points I0 to I3 are 0, 0, 1 and 0, the search unit 16A may determine that a data string that matches the target pattern is present hereabout. Similarly, in FIG. 4(B), the sample results of the sample points I0, Q0, I1, Q1, I2, Q2 and I3 are sequentially 0, 0, 0, 1, 1, 1 and 0. As the sample results of the sample points I0 to I3 are also 0, 0, 1 and 0, the search unit 16A may also determine that a data string that matches the target pattern is present hereabout.

It should be noted that, instead of the above example of AABA, the target pattern adopted by the search unit 16a may be programmable, and may be selectively adjusted according to specifications of actual applications.

The status determination unit 16B determines whether each of the data string having the target pattern is in an over-equalization status or an under-equalization status. Referring to FIG. 4(A), the sample results of the sample points Q1 and Q2 at two sides of the sample point I2 are both 0, and the status determination unit 16B may then determine such occurrence as an under-equalization status. Because of the under-equalization status, the actual waveform is smaller than the ideal waveform, and the equalization strength needs to be increased. Referring to FIG. 4(B), the sample results of the sample points Q1 and Q2 at the two sides of the sample point I2 are both 1, and the status determination unit 16B may then determine such occurrence as an over-equalization status. Because of the over-equalization status, the actual waveform is greater than the ideal waveform, and the equalization strength needs to be decreased. Conversely, in the two situations above, if the sample results of the sample points Q1 and Q2 are respectively 0 and 1, or respectively 1 and 0, the equalization strength need not be adjusted.

Next, the strength adjustment unit 16C selectively adjusts the equalization strength that the equalization module 12 uses according to the determination result of the status determination unit 16B. For example, the strength adjustment unit 16C may calculate the numbers of time that the over-equalization status and under-equalization status have occurred within a period of time, respectively. When a difference of subtracting the number of times of over-equalization status by the number of times of under-equalization status is greater than a difference threshold, the strength adjustment unit 16C decreases (e.g., decreasing from level 16 to level 15) the equalization strength that the equalization module 12 uses. In contrast, when the difference of subtracting the number of times of under-equalization status by the number of times of over-equalization status is greater than the difference threshold, the strength adjustment unit 16C increases (e.g., increasing from level 16 to level 17) the equalization strength that the equalization module 12 uses. When the difference between the number of times of over-equalization status and the number of times of under-equalization status is smaller than the difference threshold, the strength adjustment unit 16C determines that the equalization strength that the equalization module 12 uses need not be adjusted, i.e., the current equalization strength is maintained.

Figure 4C:
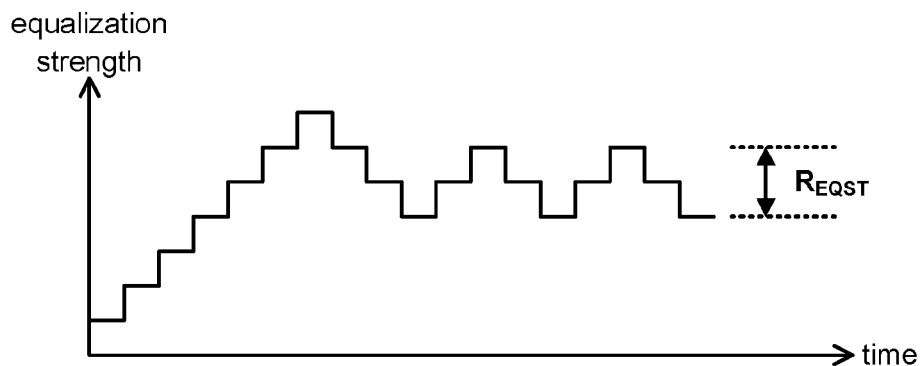
FIG. 4(C) is an exemplary corresponding relationship between an equalization strength and time.

In one embodiment, when the recovered data signal satisfies the preliminary convergence condition (i.e., when the multiplexer 18 is changed to connect to the fine tuning module 16 and the equalization module 12), if a variance in the equalization strength used by the equalization module 12 is smaller than a variance threshold within a predetermined period of time, the fine tuning module 16 determines that the equalization strength satisfies the final convergence condition. In other words, if the fine tuning module 16 is not required to adjust the equalization strength used by the equalization module 16 for a predetermined period of time, it means that the current equalization strength has a high accuracy level. The variance threshold may be selected by a circuit designer based on actual needs, and is not limited to a specific value. FIG. 4(C) shows an exemplary corresponding relationship between the equalization strength and time. For example, after a period of time, as the variance in the equalization strength used by the equalization module 12 does not exceed a predetermined range $R_{EQST}$, the fine tuning module 16 may determine that the equalization strength satisfies the final convergence condition, and utilize an average of the equalization value within this period of time as the final equalization strength.

Figure 5:
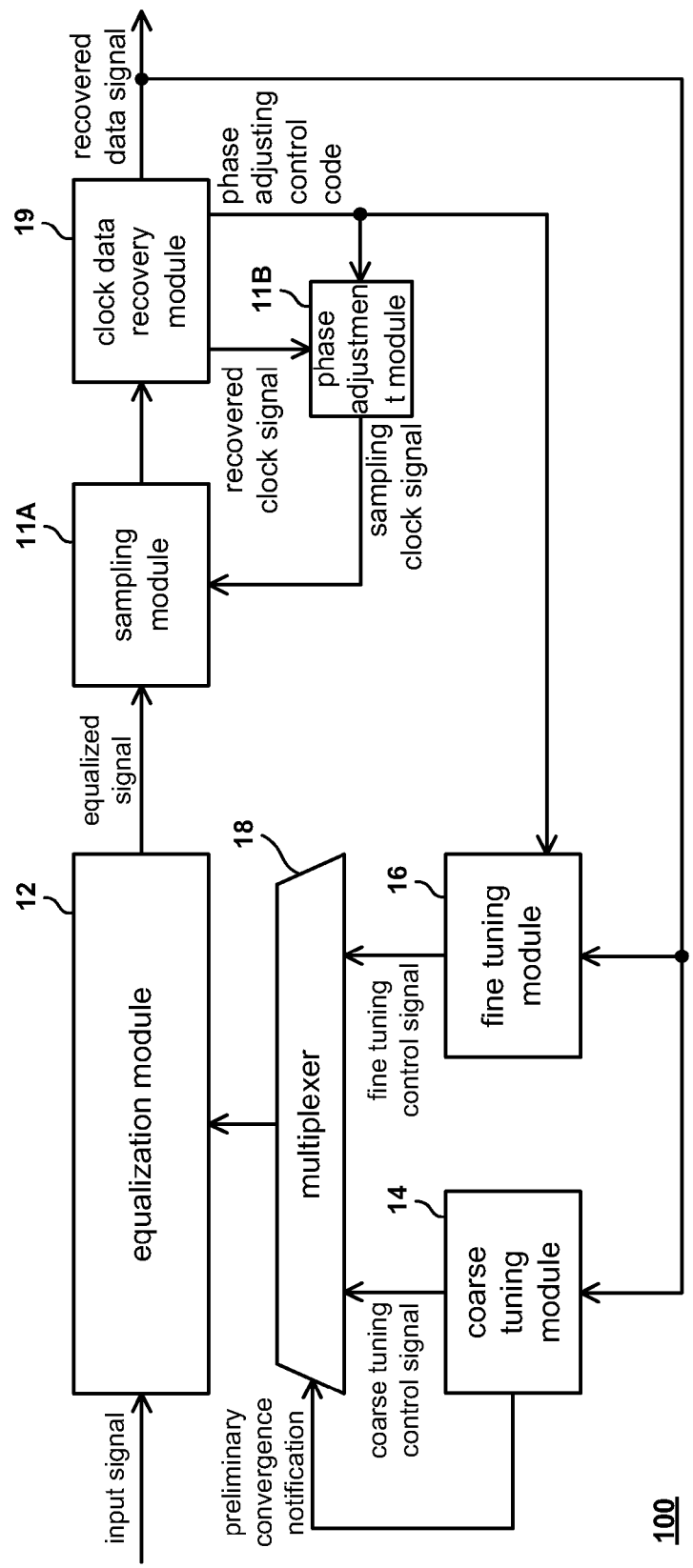
FIG. 5 is an example of a signal receiving apparatus further adopting a stable phase notification according to an embodiment of the present invention.

FIG. 5 shows an application example of the signal receiving apparatus 100. In this example, the equalized signal outputted from the equalization module 12 is provided to a sampling module 11A. A sample result generated by the sampling module 11A is transmitted to the digital clock data recovery module 19. In addition to recovered data, the digital clock recovery module 19 further generates a recovered clock signal and a phase adjusting control code according to the sample result. A phase adjustment module 11B adjusts the phase of the recovered clock signal according to the phase adjusting control code, and generates a sampling clock signal. In practice, the digital clock data recovery module 19 may generate the phase adjusting control code according to the quality of the recovered data, such that the sampling module 11A may generate preferred sample results. It should be noted that, details of generating the phase adjusting control code according to the recovered data are generally known to one person skilled in the art, and shall be omitted herein. As shown in FIG. 5, the phase adjusting control code is also provided to the fine tuning module 16. The fine tuning module 16 determines whether the phase adjusting control code has become almost stable and no longer fluctuates by a large range. Only when the phase adjusting control code indicates that the sampling clock signal outputted from the phase adjustment module 11B satisfies a stable phase condition, the strength adjustment unit 16C in the fine tuning module 16 starts to refer to the determination result of the status determination unit 16B.

The circuit architecture in FIG. 5 is applicable to a system that adopts digital clock data recovery for generating a clock signal, e.g., an HDMI interface. Compared to analog clock data recovery, digital clock data recovery needs a longer period of time for locking a clock signal to a substantially correct phase to further provide an accurate sampling clock signal. If the determination results (e.g., the sample results of the sample points I0 to I3 and the sample results of the sample points Q0 to Q3) of the status determination unit 16B are inaccurate before the sampling clock signal becomes stabilized, the strength adjustment unit 16C may be caused to give misjudged results. By adding the requirement that the sampling clock signal needs to satisfy the stable phase condition, associated issues can be prevented.

Figure 6:
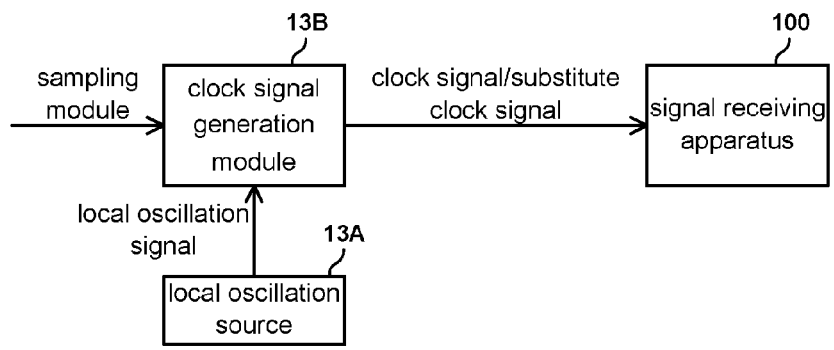
FIG. 6 is an example of a signal receiving apparatus further collaborating with a clock generating circuit according to an embodiment of the present invention.

FIG. 6 shows another application example of the signal receiving apparatus 100. As previously stated, the DP standard specifies that a receiver end needs to complete a clock recover process before performing an equalization process. In this example, the signal receiving apparatus 100 collaborates with a local oscillation source 13A and a clock signal generation module 13B. For example, the local oscillation source 13A is an oscillator that provides a local oscillation signal. In normal situations, the clock signal generation module 13B receives an original signal, and performs a clock recovery process on the original signal to generate a clock signal. To prevent the delay in a time point at which the clock signal generation module 13B generates a locked clock signal from further delaying the subsequent signal processing, if the clock signal is still unlocked after a period of time, the clock signal generation module 13B is changed to be configured to a frequency synthesizer, and to generate a substitute clock signal according to the local oscillation signal outputted from the local oscillation source 13A for the use of the subsequent circuit (e.g., the signal receiving apparatus 100).

Figure 7:
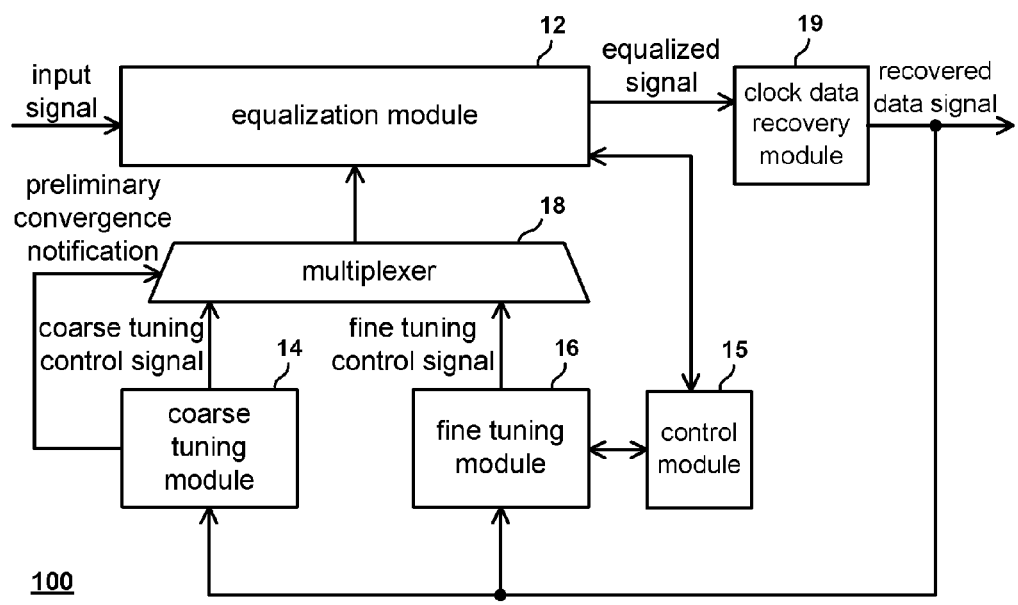
FIG. 7 is an example of a signal receiving apparatus further collaborating with a control module for test setting according to an embodiment of the present invention.

FIG. 7 shows another application example of the signal receiving apparatus 100. In this example, the signal receiving apparatus 100 collaborates with a control module 15, and assists in selecting a preferred transmission setting from a plurality of transmission settings. Taking the DP interface for example, the specification allows a training sequence be used as a test signal before a transmitter end officially sends video data, and determines which signal amplitude and which pre-emphasis level are more ideal for the transmitter end to transmit signals according to a test result of a receiver end. Details of collaborated operations of the signal receiving apparatus 100 and the control module 15 are given below.

After receiving a transmission system sends a first input signal according to a first transmission setting, the control module 15 controls the equalization module 12 to perform an equalization process on the first input signal, and the coarse tuning module 14 and the fine tuning module 16 sequentially select respective equalization strengths until the fine tuning module 16 determines that the equalization strength of the first input signal satisfies the above final convergence condition. After the fine tuning module 16 determines that the equalization strength of the first input signal satisfies the above final convergence condition, the control module 15 records a first signal quality corresponding to the first input signal. For example, the first signal quality may be the expansion level of an eye diagram of the equalized signal corresponding to the equalization strength that satisfied the final convergence condition. In practice, the first signal quality may be provided by the coarse tuning module 14 or the fine tuning module 16 to the control module 15, or may be generated by the control module 15 according to the equalized signal outputted from the equalization module 12.

After receiving a second input signal sent by the same transmission system according to a second transmission setting, the control module 15 controls the equalization module 12 to perform an equalization process on the second input signal, and the coarse tuning module 14 and the fine tuning module 16 sequentially adjust the equalization strength until the fine tuning module 16 determines that the equalization strength of the second input signal satisfies the final convergence condition. In practice, the first transmission setting and the second transmission setting may include different pre-emphasis levels and/or different signal amplitudes. It should be noted that the first transmission setting and the second transmission setting are not limited to including the two exemplary settings above. After the fine tuning module 16 determines that the equalization strength applied on the second input signal satisfies the final convergence condition, the control module 15 records a second signal quality corresponding to the second input signal. According to the first signal quality and the second signal quality, the control module 15 determines which of the first transmission setting and the second transmission setting is to the transmission system. One person skilled in the art can understand that, the number of the transmission settings that the signal receiving apparatus 100 and the control module 15 uses for testing is not limited to two; a circuit designer may determine the number of tests according to actual requirements or system specifications.

Figure 8:
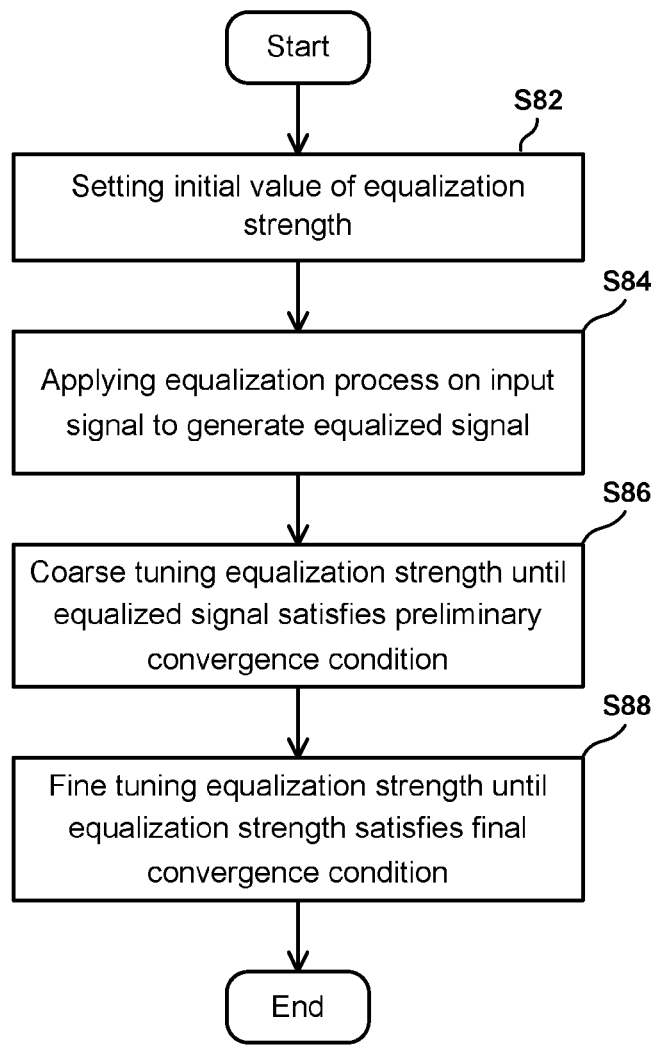
FIG. 8 is a flowchart of a two-stage adaptive equalization method according to an embodiment of the present invention.

A two-stage adaptive equalization method applied to a signal receiving apparatus is provided according to another embodiment of the present invention. FIG. 8 shows a flowchart of the method. In step S82, an initial value of an equalization strength is set. In step S84, an input signal is received, and an equalization process is performed on the input signal to generate an equalized signal. In step S86, the equalization strength of the equalization process is adjusted according to the equalized signal until the equalized signal generated by the equalization process satisfies a preliminary convergence condition. In step S88, when the equalization signal satisfies the preliminary convergence condition, the equalization strength of the equalization process is adjusted again according to the equalized signal until the equalization strength satisfies a final convergence condition.

Figure 9A:
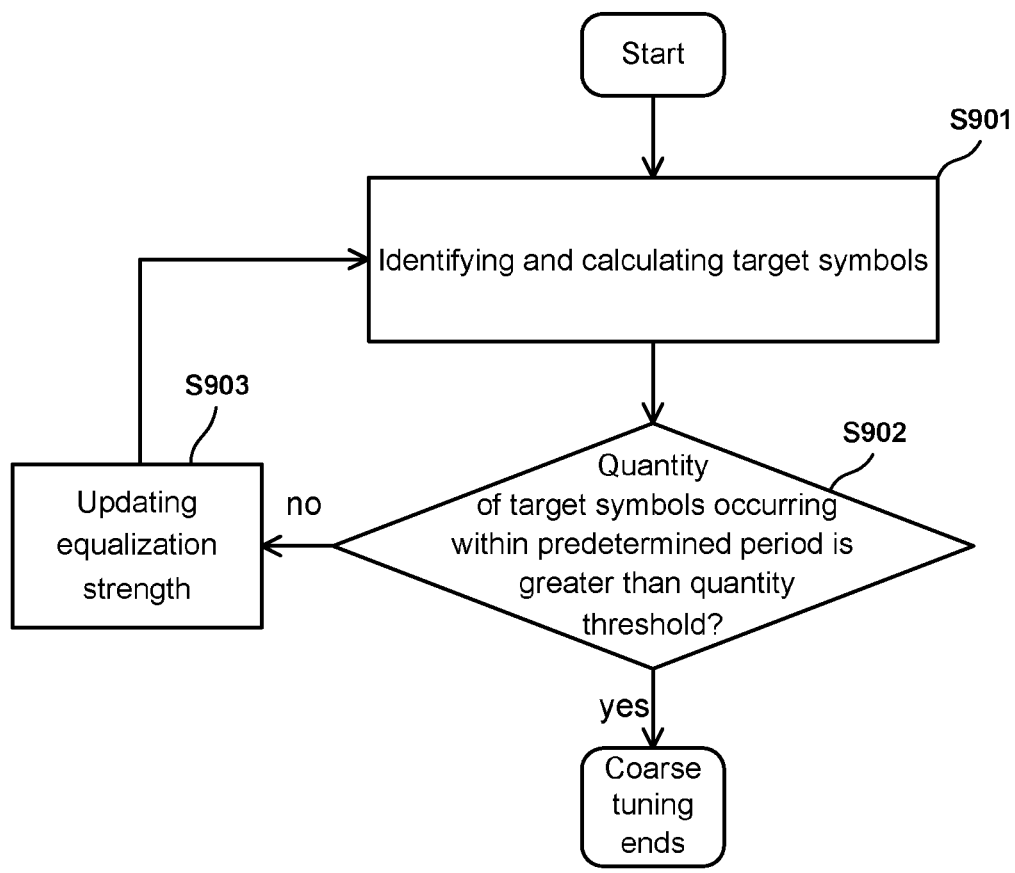
FIG. 9(A) and FIG. 9(B) are exemplary partial processes in a two-stage adaptive equalization method according to the present invention.

FIG. 9(A) shows an exemplary partial process of an adaptive equalization method according to the present invention. In step S901, target symbols are identified from a processed signal (e.g., an equalized signal or a recovered data signal generated according to the equalized signal), and a quantity of the target symbols is calculated (e.g., the task performed by the symbol counting unit 14A). In step S902, it is determined whether the total quantity of the target symbols occurring in a predetermined period is greater than a quantity threshold. The coarse tuning procedure in the adaptive equalization method ends when a determination result of step S902 is affirmative. Conversely, when the determination result of step S902 is negative, step S903 is performed to update the equalization strength applied on the processed signal. After step S903, step S901 and subsequent steps are iterated.

Figure 9B:
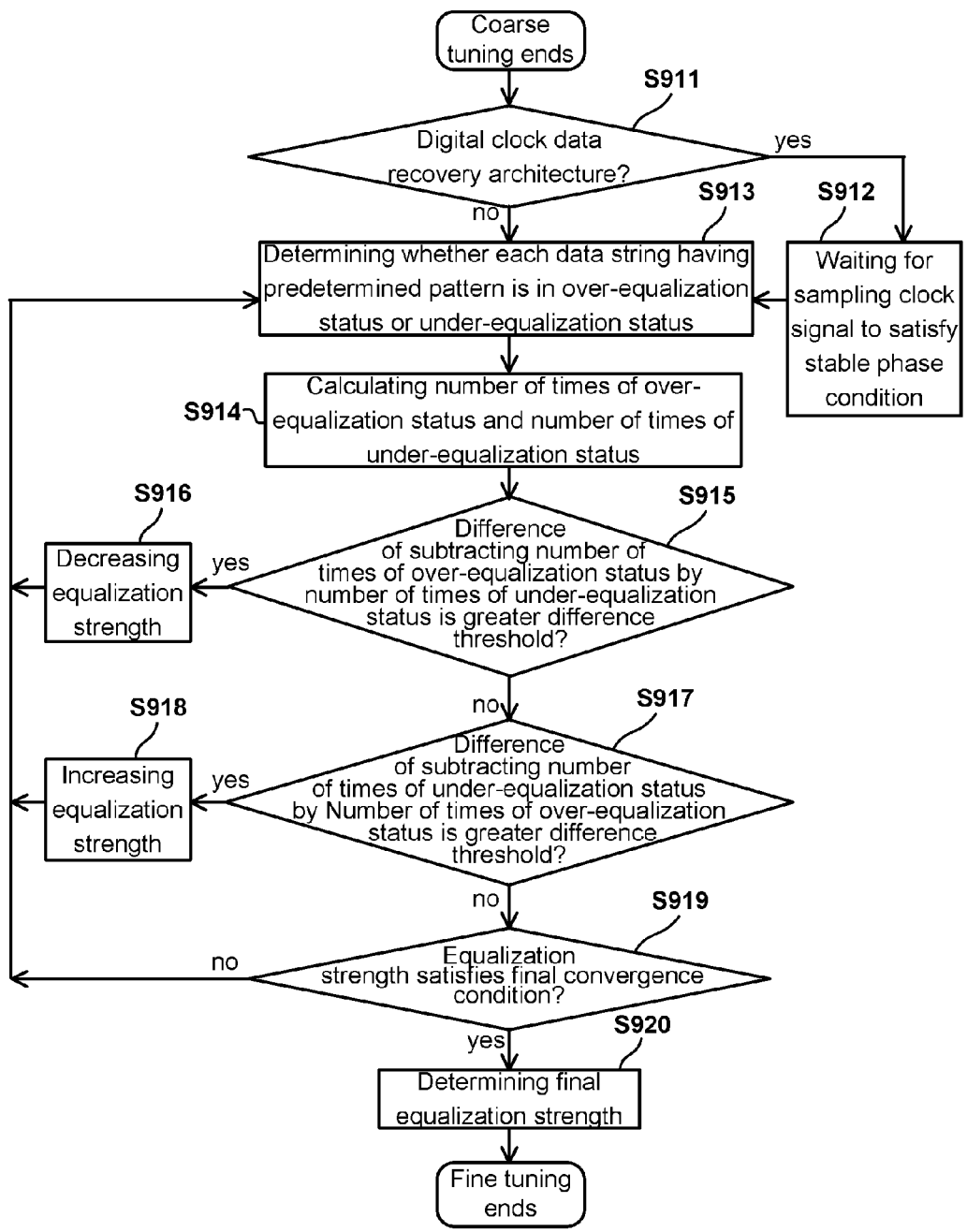

FIG. 9(B) shows another exemplary partial process of an adaptive equalization method according to the present invention. In step S911, it is determined whether an electronic system adopting the process is operating under a digital clock data recovery architecture (e.g., an HDMI interface). When the determination result of step S911 is affirmative, step S912 is performed to wait for a sampling clock signal to satisfy a stable phase condition (e.g., waiting for the phase adjusting control code in FIG. 5 to become stabilized). When the determination result S911 is negative, or after step S912, step S913 is performed. In step S913, a data string having a predetermined pattern is identified from a processed signal (e.g., an equalized signal or a recovered data signal generated according to the equalized signal), and it is determined whether the data string having the predetermined pattern is in an over-equalization status or an under-equalization status (e.g., the tasks performed by the search unit 16A and the status determination unit 16B). In step S914, within a predetermined period, the number of times of over-equalization status and the number of times of under-equalization status are calculated. In step S915, it is determined whether the difference of subtracting the number of times of over-equalization status by the number of times of under-equalization status is greater than a difference threshold. When a determination result of step S915 is affirmative, step S916 is performed to decrease the equalization strength applied on the processed signal, followed by returning to step S913. When the determination result of step S915 is negative, step S917 is performed to determine whether the difference of subtracting the number of times of under-equalization status by the number of times of over-equalization status is greater than a difference threshold. When a determination result of step S915 is affirmative, step S916 is performed to increase the equalization strength applied on the processed signal, followed by returning to step S913. When the determination result of step S917 is negative, step S919 is performed to determine whether the equalization strength satisfies a final convergence condition. When a determination result of step S919 is negative, the process returns to step S913. When the determination result of step S919 is affirmative, step S920 is performed to determine a final equalization strength (e.g., an average of the equalization strength within the period of time in which the final convergence condition is satisfied). At this point, the fine tuning procedure of the method ends.

One person skilled in the art can appreciate that, various operations and modifications in the description associated with the signal receiving apparatus 100 can be applied to the two-stage adaptive equalization method in FIG. 8, FIG. 9(A) and FIG. 9(B), and shall be omitted herein.

In conclusion, the present invention provides a signal receiving apparatus and a two-stage adaptive equalization method applied to the signal receiving apparatus. According to embodiments of the present invention, the procedure of selecting the equalization strength is divided into two phases having different convergence conditions. In addition to adaptively adjusting the equalization strength according to an input signal, the signal receiving apparatus and the equalization method of the present invention are further capable of ensuring that the final selected equalization strength is within a correct range through the inspection of the two adjustment phases.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal receiving apparatus, comprising:
an equalization module, configured to receive an input signal and to perform an equalization process on the input signal according to an equalization strength to generate an equalized signal;
a coarse tuning module, coupled to the equalization module, configured to adjust the equalization strength according to the equalized signal until the equalized signal satisfies a preliminary convergence condition;
a fine tuning module, coupled to the equalization module, configured to adjust the equalization strength according to the equalized signal when the equalized signal satisfies the preliminary convergence condition until the equalization strength satisfies a final convergence condition;
a local oscillation source, configured to provide a local oscillation signal; and
a clock signal generation module, configured to receive an original signal and to perform a clock signal recovery process on the original signal to generate a clock signal;
wherein the clock signal generation module is configured as a frequency synthesizer to generate a substitute clock signal according to the local oscillation signal, if the clock signal remains in an unlocked status after a period of time.

2. The signal receiving apparatus according to claim 1, further comprising:
a clock data recovery module, configured to perform a clock data recovery process on the equalized signal and to provide the processed signal to at least one of the coarse tuning module and the fine tuning module.

3. The signal receiving apparatus according to claim 1, wherein the coarse tuning module comprises:
an eye diagram analysis unit, configured to generate an eye diagram of the equalized signal and to determine an expansion level of the eye diagram;
wherein the preliminary convergence condition comprises determining whether the expansion level is greater than an expansion level threshold.

4. The signal receiving apparatus according to claim 1, wherein the final convergence condition is that a variance of the equalization strength is smaller than a variance threshold within a predetermined period.

5. The signal receiving apparatus according to claim 1, further comprising:
a control module, configured to generate a plurality of signal qualities according to a plurality of test signals respectively corresponding to different transmission settings, and to determine the transmission setting of a transmission system according to the signal qualities;
wherein each of the signal qualities is generated when the fine tuning module determines that the equalization strength satisfies the final convergence condition.

6. The signal receiving apparatus according to claim 5, wherein the transmission setting comprises a pre-emphasis level and/or a signal amplitude.

7. A two-stage adaptive equalization method, applied to a signal receiving apparatus, the method comprising:
a1) providing a local oscillation signal;
a2) receiving an original signal and performing a clock recovery process on the original signal to generate a clock signal, wherein if the clock signal remains in an unlocked status after a period of time, applying a frequency synthesis process on the local oscillation signal to generate a substitute clock signal;
a3) receiving an input signal and performing an equalization process on the input signal according to an equalization strength to generate an equalized signal;
b) coarse tuning the equalization strength according to the equalized signal until the equalized signal satisfies a preliminary convergence condition; and
c) when the equalized signal satisfies the preliminary convergence condition, fine tuning the equalization strength according to the equalized signal until the equalization strength satisfies a final convergence condition.

8. The two-stage adaptive equalization method according to claim 7, wherein the equalized signal is applied in step (b) and step (c) after a clock data recovery process is performed on the equalized signal.

9. The two-stage adaptive equalization method according to claim 7, wherein step (b) comprises:
generating an eye diagram of the equalized signal; and
determining an expansion level of the eye diagram;
wherein the preliminary convergence condition comprises determining whether the expansion level is greater than an expansion level threshold.

10. The two-stage adaptive equalization method according to claim 7, wherein the final convergence condition is that a variance of the equalization strength is smaller than a variance threshold within a predetermined period.

11. A signal receiving apparatus, comprising:
an equalization module, configured to receive an input signal and to perform an equalization process on the input signal according to an equalization strength to generate an equalized signal;
a coarse tuning module, coupled to the equalization module, configured to adjust the equalization strength according to the equalized signal until the equalized signal satisfies a preliminary convergence condition;
a fine tuning module, coupled to the equalization module, configured to adjust the equalization strength according to the equalized signal when the equalized signal satisfies the preliminary convergence condition until the equalization strength satisfies a final convergence condition;
wherein the coarse tuning module comprises:
a symbol counting unit, configured to identify a plurality of target symbols in the equalized signal and to count a total quantity of the target symbols;
wherein the preliminary convergence condition comprises determining whether the total quantity of the target symbols is greater than a quantity threshold, and when the input signal is compliant with DisplayPort (DP) interface specification, the target symbol is a K28.5 bit string in a training sequence; or when the input signal is compliant with one of a High-Definition Multimedia Interface (HDMI) specification and a Mobile High-definition Link (MHL) interface specification, the target symbol is comprise a predetermined control words in a blanking interval.

12. A signal receiving apparatus, comprising:
an equalization module, configured to receive an input signal and to perform an equalization process on the input signal according to an equalization strength to generate an equalized signal;

a coarse tuning module, coupled to the equalization module, configured to adjust the equalization strength according to the equalized signal until the equalized signal satisfies a preliminary convergence condition;

a fine tuning module, coupled to the equalization module, configured to adjust the equalization strength according to the equalized signal when the equalized signal satisfies the preliminary convergence condition until the equalization strength satisfies a final convergence condition, comprises:

a search unit, configured to identify a plurality of data strings matching a predetermined pattern from the equalized signal;

a status determination unit, configured to determine whether the plurality of data strings are in an over-equalization status or an under-equalization status to generate a determination result; and a strength adjustment unit, configured to selectively adjust the equalization strength of the equalization process according to the determination result.

13. The signal receiving apparatus according to claim 12, further comprising:

a sampling module, configured to sample the equalized signal according to a sampling clock signal to generate a sample result;

a digital clock data recovery module, configured to generate a recovered data signal, a recovered clock signal and a phase adjusting control code according to the sample result, wherein the recovered data signal is the equalized signal; and a phase adjustment module, configured to adjust a phase of the recovered clock signal according to the phase adjusting control code to generate the sampling clock signal;

wherein, only when the phase adjusting control code indicates that the sampling clock signal satisfies a stable phase condition, the strength adjustment unit starts to adjust the equalization strength of the equalization process according to the determination result.

14. A two-stage adaptive equalization method, applied to a signal receiving apparatus, the method comprising:

a) receiving an input signal and performing an equalization process on the input signal according to an equalization strength to generate an equalized signal; and b) coarse tuning the equalization strength according to the equalized signal until the equalized signal satisfies a preliminary convergence condition, including identifying a plurality of target symbols in the equalized signal and counting a total quantity of the target symbols;

wherein the preliminary convergence condition comprises determining whether the total quantity of the target symbols is greater than a quantity threshold; and when the input signal is compliant with DisplayPort (DP) interface specification, the target symbol is a K28.5 bit string in a training sequence; or when the input signal is compliant with one of a High-Definition Multimedia Interface (HDMI) specification and a Mobile High-definition Link (MHL) interface specification, the target symbol is comprise a predetermined control words in a blanking interval, and c) when the equalized signal satisfies the preliminary convergence condition, fine tuning the equalization strength according to the equalized signal until the equalization strength satisfies a final convergence condition.

15. A two-stage adaptive equalization method, applied to a signal receiving apparatus, the method comprising:

a) receiving an input signal and performing an equalization process on the input signal according to an equalization strength to generate an equalized signal;

b) coarse tuning the equalization strength according to the equalized signal until the equalized signal satisfies a preliminary convergence condition; and c) when the equalized signal satisfies the preliminary convergence condition, fine tuning the equalization strength according to the equalized signal until the equalization strength satisfies a final convergence condition;

wherein step (c) comprises:

c1) identifying a plurality of data strings matching a predetermined pattern from the equalized signal;

c2) determining whether the plurality of data strings are in an over-equalization status or an under-equalization status to generate a determination result; and c3) selectively adjusting the equalization strength of the equalization process according to a determination result.

16. The two-stage adaptive equalization method according to claim 15, further comprising:

sampling the equalized signal according to a sampling clock signal to generate a sample result;

generating a recovered data signal, a recovered clock signal and a phase adjusting control code according to the sample result, wherein the recovered data signal is the equalized signal;

adjusting a phase of the recovered clock signal according to the phase adjusting control code to generate the sampling clock signal; and only when the phase adjusting control code indicates that the sampling clock signal satisfies a stable phase condition, starting to perform step (c3).

* * * * *